US009653095B1

(12) United States Patent
Tcheng

(10) Patent No.: US 9,653,095 B1
(45) Date of Patent: May 16, 2017

(54) SYSTEMS AND METHODS FOR DETERMINING A REPEATOGRAM IN A MUSIC COMPOSITION USING AUDIO FEATURES

(71) Applicant: GOPRO, INC., San Mateo, CA (US)

(72) Inventor: David Tcheng, Vista, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/251,571

(22) Filed: Aug. 30, 2016

(51) Int. Cl.
  *G10H 1/06* (2006.01)
  *G10L 25/51* (2013.01)

(52) U.S. Cl.
  CPC ............. *G10L 25/51* (2013.01); *G10H 1/06* (2013.01); *G10H 2210/061* (2013.01); *G10H 2210/066* (2013.01)

(58) Field of Classification Search
  CPC ....................................................... G10H 1/06
  USPC ............................................................ 84/616
  See application file for complete search history.

(56) References Cited

U.S. PATENT DOCUMENTS

| | | | | |
|---|---|---|---|---|
| 5,175,769 | A | 12/1992 | Hejna | |
| 6,564,182 | B1 * | 5/2003 | Gao | G10L 25/90 704/207 |
| 7,012,183 | B2 * | 3/2006 | Herre | G10H 1/40 704/E19.019 |
| 7,256,340 | B2 * | 8/2007 | Okazaki | G10H 7/02 704/500 |
| 7,301,092 | B1 * | 11/2007 | McNally | G10H 1/368 84/612 |
| 7,461,002 | B2 | 12/2008 | Crockett | |
| 7,521,622 | B1 * | 4/2009 | Zhang | G10L 25/78 84/603 |
| 7,593,847 | B2 * | 9/2009 | Oh | G10L 25/90 704/207 |
| 7,619,155 | B2 * | 11/2009 | Teo | G10G 3/04 84/609 |
| 7,672,836 | B2 * | 3/2010 | Lee | G10L 25/90 704/207 |
| 7,745,718 | B2 * | 6/2010 | Makino | G06F 17/30743 84/615 |
| 7,767,897 | B2 * | 8/2010 | Jochelson | G10H 1/40 84/609 |
| 7,863,513 | B2 * | 1/2011 | Ishii | G10H 1/0041 84/645 |

(Continued)

*Primary Examiner* — David Warren
(74) *Attorney, Agent, or Firm* — Sheppard Mullin Richter & Hampton LLP

(57) ABSTRACT

A dataset representing repeated sounds within a musical composition recorded on an audio track may be constructed. An audio track duration of an audio track may be partitioned into partitions of a partition size. A current partition may be compared to remaining partitions of the audio track. Audio information for the current partition may be correlated to audio information for remaining partitions to determine a correlated partition for the current partition from among the remaining partitions of the track duration. The correlated partition determined may be identified as most likely to represent the same sound as the current partition. This comparison process may be performed iteratively, for individual ones of the remaining partitions. Correlation results of the comparison process may be recorded to represent the partition time period of the correlated partition as a function of partition time period of the current partition.

20 Claims, 6 Drawing Sheets

(56) References Cited

U.S. PATENT DOCUMENTS

| | | | |
|---|---|---|---|
| 7,985,917 B2* | 7/2011 | Morris | G10H 1/0025 84/610 |
| 8,101,845 B2* | 1/2012 | Kobayashi | G10H 1/0008 84/609 |
| 8,111,326 B1 | 2/2012 | Talwar | |
| 8,179,475 B2 | 5/2012 | Sandrew | |
| 8,193,436 B2* | 6/2012 | Sim | G10H 1/00 84/609 |
| 8,223,978 B2* | 7/2012 | Yoshizawa | G08G 1/017 381/56 |
| 8,378,198 B2* | 2/2013 | Cho | G10H 1/00 84/615 |
| 8,411,767 B2* | 4/2013 | Alexander | H04L 25/0204 375/260 |
| 8,428,270 B2 | 4/2013 | Crockett | |
| 8,497,417 B2* | 7/2013 | Lyon | G06F 17/30743 84/609 |
| 8,785,760 B2* | 7/2014 | Serletic | G06F 3/0481 381/119 |
| 8,964,865 B2* | 2/2015 | Alexander | H04L 25/0204 370/208 |
| 9,031,244 B2* | 5/2015 | Lang | H03G 3/3089 381/56 |
| 9,418,643 B2 | 8/2016 | Eronen | |
| 2002/0133499 A1 | 9/2002 | Ward | |
| 2003/0033152 A1* | 2/2003 | Cameron | G10L 15/26 704/275 |
| 2004/0083097 A1* | 4/2004 | Chu | G10L 19/022 704/219 |
| 2004/0094019 A1* | 5/2004 | Herre | G10H 1/40 84/611 |
| 2004/0148159 A1 | 7/2004 | Crockett | |
| 2004/0165730 A1 | 8/2004 | Crockett | |
| 2004/0172240 A1 | 9/2004 | Crockett | |
| 2004/0254660 A1* | 12/2004 | Seefeldt | G10H 1/40 700/94 |
| 2004/0264561 A1* | 12/2004 | Alexander | H04L 25/0204 375/232 |
| 2005/0021325 A1* | 1/2005 | Seo | G10L 25/90 704/207 |
| 2005/0091045 A1* | 4/2005 | Oh | G10L 25/90 704/207 |
| 2005/0234366 A1* | 10/2005 | Heinz | G10H 1/00 600/559 |
| 2006/0021494 A1* | 2/2006 | Teo | G10G 3/04 84/616 |
| 2006/0080088 A1* | 4/2006 | Lee | G10L 25/90 704/207 |
| 2006/0107823 A1* | 5/2006 | Platt | G06F 17/30749 84/616 |
| 2007/0055503 A1* | 3/2007 | Chu | G10L 19/022 704/219 |
| 2007/0055504 A1* | 3/2007 | Chu | G10L 19/022 704/219 |
| 2007/0061135 A1* | 3/2007 | Chu | G10L 19/022 704/219 |
| 2007/0163425 A1* | 7/2007 | Tsui | G09B 15/023 84/609 |
| 2007/0240556 A1* | 10/2007 | Okazaki | G10H 7/02 84/604 |
| 2008/0148924 A1* | 6/2008 | Tsui | G09B 15/023 84/618 |
| 2008/0304672 A1* | 12/2008 | Yoshizawa | G08G 1/017 381/56 |
| 2008/0317150 A1* | 12/2008 | Alexander | H04L 25/0204 375/260 |
| 2009/0049979 A1 | 2/2009 | Naik | |
| 2009/0056526 A1 | 3/2009 | Yamashita | |
| 2009/0170458 A1* | 7/2009 | Molisch | H04B 1/71637 455/226.1 |
| 2009/0217806 A1* | 9/2009 | Makino | G06F 17/30743 84/616 |
| 2009/0287323 A1 | 11/2009 | Kobayashi | |
| 2010/0257994 A1 | 10/2010 | Hufford | |
| 2011/0167989 A1* | 7/2011 | Cho | G10H 1/00 84/615 |
| 2012/0103166 A1* | 5/2012 | Shibuya | G06F 17/30743 84/616 |
| 2012/0127831 A1 | 5/2012 | Gicklhorn | |
| 2012/0297959 A1* | 11/2012 | Serletic | G06F 3/0481 84/626 |
| 2013/0025437 A1* | 1/2013 | Serletic | G10H 1/0025 84/634 |
| 2013/0201972 A1* | 8/2013 | Alexander | H04L 25/0204 370/336 |
| 2013/0220102 A1* | 8/2013 | Savo | G06F 3/0481 84/609 |
| 2013/0304243 A1 | 11/2013 | Iseli | |
| 2013/0339035 A1 | 12/2013 | Chordia | |
| 2014/0053710 A1* | 2/2014 | Serletic, II | G10H 7/00 84/609 |
| 2014/0053711 A1* | 2/2014 | Serletic, II | G10H 1/38 84/611 |
| 2014/0067385 A1 | 3/2014 | Oliveira | |
| 2014/0123836 A1* | 5/2014 | Vorobyev | G10H 1/0008 84/616 |
| 2014/0180637 A1 | 6/2014 | Kerrigan | |
| 2014/0307878 A1 | 10/2014 | Osborne | |
| 2015/0279427 A1 | 10/2015 | Godfrey | |
| 2016/0192846 A1* | 7/2016 | Shekhar | A61B 5/02028 600/528 |

* cited by examiner

SYSTEMS AND METHODS FOR DETERMINING A REPEATOGRAM IN A MUSIC COMPOSITION USING AUDIO FEATURES

FIELD

The disclosure relates to constructing a dataset representing similar segments in a music composition using audio energy.

BACKGROUND

Musical compositions may be characterized by being self-similar. A musical composition may contain acoustically similar segments throughout its duration.

SUMMARY

Musical composition recorded on an audio track may include segments or partitions that are repeated one or more times throughout a duration of the audio track. An algorithm may compare a partition of the audio track to the audio track itself to determine which other partition of the audio track correlates best with the partition. A minimum distance between the partition and other partitions being compared may be set. The minimum distance may be determined by a user, set by a minimum distance parameter, and/or otherwise determined. The minimum distance may be constant and/or may be varied. A time to the most correlated partition may be determined and recorded. A dataset creating a visual representation of partitions being repeated throughout the audio track may be constructed (a "Repeatogram").

The dataset may be constructed by comparing a current partition of an audio track to all remaining partitions of the audio track, determining a correlated partition that represent most likely the same sound as the current partition, and plotting the time from the current partition to the correlated partition within the audio track on y-axis while the time of audio track duration is plotted on the x-axis. This process may be repeated iteratively for one or more partitions of one or more audio tracks.

In some implementations, a system configured for constructing a dataset for representing repeated sounds within an audio track may include one or more servers. The server(s) may be configured to communicate with one or more client computing platforms according to a client/server architecture. The users of the system may access the system via client computing platform(s). The server(s) may be configured to execute one or more computer program components. The computer program components may include one or more of an audio track component, a partition component, a comparison component, a correlation component, a repeatogram component, and/or other components.

The audio track component may be configured to obtain one or more audio tracks from one or more media files. By way of non-limiting illustration, an audio track and/or other audio tracks may be obtained from a media file and/or other media files. The media file may be available within the repository of media files available via the system and/or available on a third party platform, which may be accessible and/or available via the system.

The audio track component may be configured to obtain audio content obtained from one or more audio tracks obtained from one or more media files. Audio content may include musical content. As one example, musical content may be in the form of a musical composition such as a song performance, a classical music performance, an electronic music performance and/or other musical content.

The audio track component may be configured to obtain audio tracks from media files by extracting audio signals from media files, and/or by other techniques. By way of non-limiting illustration, the audio track component may be configured to obtain an audio track by extracting audio signal from the media file. Audio signal may include audio information and may contain sound information. Audio information contained within a media file may be extracted in the form of an audio track.

In some implementations, the audio track component may be configured to extract audio signals from one or more media files associated with one or more frequency by applying one or more frequency bandpass filters. For example, a frequency bandpass filter applied to the media file may extract audio signal having frequencies between 1000 Hz and 5000 Hz.

The audio track component may be configured to extract audio features of the audio information obtained from the audio track. Audio features may include audio energy representations, audio frequency representations, harmonic sound information, and/or other features.

In some implementations, the audio track component may be configured to extract one or more audio energy representations from one or more audio tracks. By way of non-limiting illustration, an audio energy representation and/or other representations may be extracted from the audio track.

In some implementations, the audio track component may be configured to transform one or more audio energy representations into a frequency domain to generate a spectral energy profile of the one or more audio energy representations. By way of non-limiting illustration, the audio track component may be configured to transform an audio energy representation of an audio track into a frequency domain to generate a spectral energy profile of the audio energy representation.

In some implementations, the audio track component may be configured to obtain harmonic sound information representing a harmonic sound from one or more audio tracks. Harmonic information may be obtained by transforming one or more audio energy representations of one or more audio tracks into a frequency space in which energy may be represented as a function of frequency to generate a harmonic energy spectrum of the one or more audio tracks.

The partition component may be configured to obtain one or more partition sizes. One or more partition sizes may include a partition size value that refers to a portion of an audio track duration. The partition size value may be expressed in time units including seconds, milliseconds, and/or other units. The partition component may be configured to obtain one or more partition size values that may include a partition size generated by a user, a randomly generated partition size, and/or otherwise obtained. By way of non-limiting illustration, a partition size may be obtained.

The partition component may be configured to partition one or more audio track durations of one or more audio tracks into multiple partitions of one or more partition sizes. Individual partitions of one or more partition sizes may span the entirety of the audio track comprised of audio information obtained via audio track component 106 from the audio wave content of one or more audio tracks. By way of non-limiting illustration, the audio track may be partitioned into multiple partitions of the partition size. Individual partitions may occur at different time periods of the audio track duration. By way of non-limiting illustration, individual partitions of the partition size partitioning the audio track may occur at different time periods of the audio track duration.

The comparison component may be configured to compare one or more partitions of one or more audio tracks to remaining one or more partitions of one or more audio tracks. For example, the comparison component may be configured to correlate audio features of one or more partitions of one or more audio tracks. By way of non-limiting illustration, a current partition of the partition size of the audio track may be compared against all remaining partitions of the current partition size of the audio track to correlate individual audio features of individual remaining partitions.

In various implementations, the comparison component may be configured to compare one or more audio features of one or more partitions of one or more audio tracks. For example, the comparison component may be configured to compare one or more audio energy representations of one or more partitions of one or more audio tracks. In some implementations, the comparison component may be configured to compare one or more audio frequency representations of one or more partitions of one or more audio tracks. In yet another implementation, the comparison component may be configured to compare one or more harmonic information of one or more partitions, of one or more audio tracks, including pitch of the harmonic sound and harmonic energy of one or more partitions and/or other features.

In some implementations, the comparison component may be configured to compare audio features of individual partitions of one or more audio track within the multi-resolution framework, which is incorporated by reference.

This process performed by the comparison component may be iterative such that the comparison component may compare audio features of the current partition of the partition size of the audio track against remaining partitions of the partition size of the audio track of the audio track for every partition of the audio track whereby changing the position of the current partition within the audio track duration with individual iteration until the end of the audio track duration has been reached. For example, if the number of the partitions partitioning the audio track duration is x, the comparison component may be configured to perform the comparison process x times. First, a partition at a first audio track duration position may be compared to x−1 number of partitions, then, at next iteration the comparison component may be configured to compare a partition at a second audio track duration position to x−1 number of partitions, and so on, until the last partition of the number of partitions is reached. The system may accumulate a number of transmitted correlation results obtained from the comparison component. The correlation results may be transmitted to the system and a determination for the most accurate result during each iteration may be made.

In various implementations, the comparison component may be configured to apply one or more constraint parameters to control the comparison process. The comparison constraint parameters may include one or more of setting a minimum distance between comparison being compared, limiting a comparison time, limiting frequency bands, limiting a number of comparison iterations and/or other constrains.

The comparison component may be configured to apply a minimum distance parameter when comparing the current partition of the partition size of the audio track against the remaining partitions of the partition size of the audio track. The minimum distance parameter may refer to a portion of the audio track duration between the current partition and the remaining partitions. The minimum distance parameter applied may be constant and/or may be varied with every comparison iteration. By way of non-limiting illustration, a certain portion of the track duration corresponding to a distance between a current partition and remaining partitions may be removed from a comparison process. For example, a minimum distance parameter corresponding to a shorter distance between the current partition and the remaining partitions may result in finding correlated partitions characterized by a short distance to the current partition (e.g., a drum beat repeating at every measure). The minimum distance parameter corresponding to a longer distance between the current partition and the remaining partitions may result in finding correlated partitions characterized by a longer distance to the current partition.

The minimum distance parameter may be set by a system, selected by a user, and/or otherwise obtained. In some implementations, the minimum distance parameter may include values that are periodic and cycle through a set of minimum distances with each iteration. For example, a minimum distance parameter may include values representing a distance from a current partition to remaining partitions equal to 0.5 second, 1 second, 2 seconds, 4 seconds, 8 seconds, 16 seconds, 32 seconds, 64 seconds, 128 seconds, 256 seconds, and/or include other values.

The comparison component may be configured to determine a time it took to compare the current partition of the partition size of the audio track against the remaining partitions of the partition size of the audio track. Time taken to compare audio features of the current partition of the audio track to audio features of the remaining individual partitions of the audio track may be transmitted to the system. The comparison component may utilize the time taken to correlate audio features of the current partition in subsequent comparison iterations. For example, time taken to compare a current partition of the remaining partitions may be equal to 5 seconds. The comparison component may be configured to limit the next comparison iteration at a subsequent temporal window to 5 seconds. In one implementation, the time taken to compare initial current partition may be utilized by the other constraint comparison parameters and/or used as a constant value.

The comparison component may be configured to limit the audio track duration of one or more audio tracks during the comparison process by applying a comparison window set by a comparison window parameter. The comparison component may be configured to limit the audio track duration of one or more audio track being compared by applying the comparison window parameter (i.e., by setting a comparison window). The comparison window parameter may include a time of audio track duration to which the comparison may be limited, a position of the comparison window, including a start position and an end position, and/or other constrains. This value may be predetermined by the system, set by a user, and/or otherwise obtained.

In some implementation, the comparison component may be configured to limit the audio track duration such that the comparison window parameter may not be greater than 50 percent of the audio track duration. For example, if an audio track is 500 seconds then the length of the comparison window set by the comparison window parameter may not be greater than 250 seconds.

The comparison window parameter may have a predetermined start position that may be generated by the system and/or may be based on user input. System 100 may generate a start position of the comparison window based on the audio track duration. For example, the start position may be randomly set to a portion of the audio track duration. In some implementations, the user may generate the start position of the comparison window based on specific audio features of the audio track. For example, user may know that an audio track may contain audio features in an introductory portion of the audio track that represent the same sound captured at a final portion of the audio track. For example, a musical composition may be characterized by a number of sections that may be recombined and repeated in different ways throughout the composition. An introductory section may often contain a primary theme that may be repeated often, a middle section may contain original theme that may contain elements of the primary theme, and a final section may contain restatement of the primary theme. Thus, audio features associated with the introductory section and the final section may be used to generate the Repeatogram.

The comparison component may be configured to exclude one or more portions of one or more audio tracks from the comparison process during every comparison iteration based on the comparison window parameter. The comparison component may be configured to exclude same and/or different portion of one or more audio tracks from the comparison process. For example, the comparison component may be configured to exclude a portion of the audio track during every iteration performed by the comparison component.

In some implementations, the comparison component may be configured to compare audio features of the current partition of the audio track against audio features of the remaining partitions of the audio track within the multi-resolution framework, which is incorporated by reference.

For example, the comparison component may be configured to compare audio features of the current partitions of the audio track against remaining partitions of the second audio track at a mid-resolution level. Audio features of individual partitions of the audio track at the mid-resolution level may be compared at the mid-resolution level to correlate audio features between the current partition of the audio track and the remaining partitions of the audio track. The result of a first comparison may identify correlated audio features from the current partition and the remaining partitions of the audio tracks that may represent energy in the same sound. The result of the first comparison may be transmitted to the system after the first comparison is completed.

The second comparison may be performed at a level of resolution that may be higher than the mid-resolution level. Audio features of individual partitions of the audio track at the higher resolution level may be compared at the higher resolution level to correlate audio features between the current partition of the audio track and the remaining partitions of the audio track. The result of the second comparison may be transmitted to the system.

This process may be iterative such that the comparison component may compare audio features of the current partition of the audio track against audio features of the remaining partitions of the audio track at every resolution level whereby increasing the resolution with individual iteration until the highest level of resolution is reached. For example, if the number of resolution levels within individual audio track is finite, the comparison component may be configured to compare audio features at a mid-resolution level first, then, at next iteration, the comparison component may be configured to compare audio features at a resolution level higher than the resolution level of previous iteration, and so on. The last iteration may be performed at the highest resolution level. The system may accumulate a number of transmitted correlation results obtained from the comparison component. The correlation results may be transmitted to the system and a determination for the most accurate result may be made.

The correlation component may be configured to determine a correlated partition for the current partition from among the remaining partitions of the audio track that is most likely to represent the same sounds as the current partition. By way of non-limiting illustration, the correlation component may be configured to determine a correlated partition for the current partition from among the remaining partitions of the audio track based on the results of comparing the current partition of the partition size obtained by the partitioning component via the comparison component to correlate audio features obtained by audio track component, and/or based on other techniques. The correlated partition may reflect a partition that most likely represents the same sound as the current partition.

In some implementations, the correlation component may be configured to determine multiple correlated partitions between the current partition of the audio track and the remaining partitions of the audio track. Individual correlated partitions may be based on comparing individual audio features of one or more partitions of the audio track via the comparison component, as described above. The correlation component may be configured to assign a weight to individual correlated partitions. The correlation component may be configured to determine a final correlated partition by computing weighted averages of multiple correlated partitions and/or by performing other computations.

The repeatogram component may be configured to record the correlation between the current partition of the audio track and the correlated partition of the audio track. By way of non-limiting illustration, the repeatogram component may be configured to record a time from the current partition to the most correlated partition determined by the correlation component, and/or based on other techniques. With every iteration performed by the comparison component, the repeatogram component may be configured to record a correlation such that a time from a next current partition to the most correlated partition with the next partition is recorded. The system may accumulate a number of records associated with times between a current partition and a most correlated partition transmitted by the repeatogram component.

The repeatogram component may be configured to construct a dataset representing multiple correlations determined by the correlation component as a result of multiple iterations performed by the comparison component. The repeatogram component may be configured to construct a dataset that may visually represent repeated partitions of the audio track by plotting multiple correlations in a two-dimensional time space as data points with the size of individual data points monotonically increasing with correlation strength. The two-dimensional time space may be characterized by a two-coordinate system in which an x-axis may represent the audio duration time, including the current partition time, and a y-axis may represent a time from the current partition to the correlated partition. By way of non-limiting illustration, the repeatogram component may be configured to plot the time from the current partition to the most correlated partition determined by the correlation component on the y-axis as a function of the current partition time on the x-axis. The repeatogram component may be configured to construct the dataset representing every iteration performed by the comparison component such that every time from a next current partition to the most correlated partition with the next partition recorded is plotted in the two-dimensional time space.

The repeatogram component may be configured to include positive and negative values on the y-axis representing the time from the current partition to the correlated partition. The value of the time from the current partition to the correlated partition may be based on the relative position of the current partition to the correlated partition within the audio track duration and/or based on other techniques. By way of non-limiting illustration, the repeatogram component may be configured to assign a positive value to the time between the correlated partition and the current partition if the correlated partition occurs after the current partition on the audio track duration. The repeatogram component may be configured to assign a negative value to the time between the correlated partition and the current partition if the correlated partition occurs before the current partition on the audio track duration. The repeatogram component may be configured plot the positive time value on the y-axis representing positive values. The repeatogram component may be configured plot the negative time value on the y-axis representing negative values.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
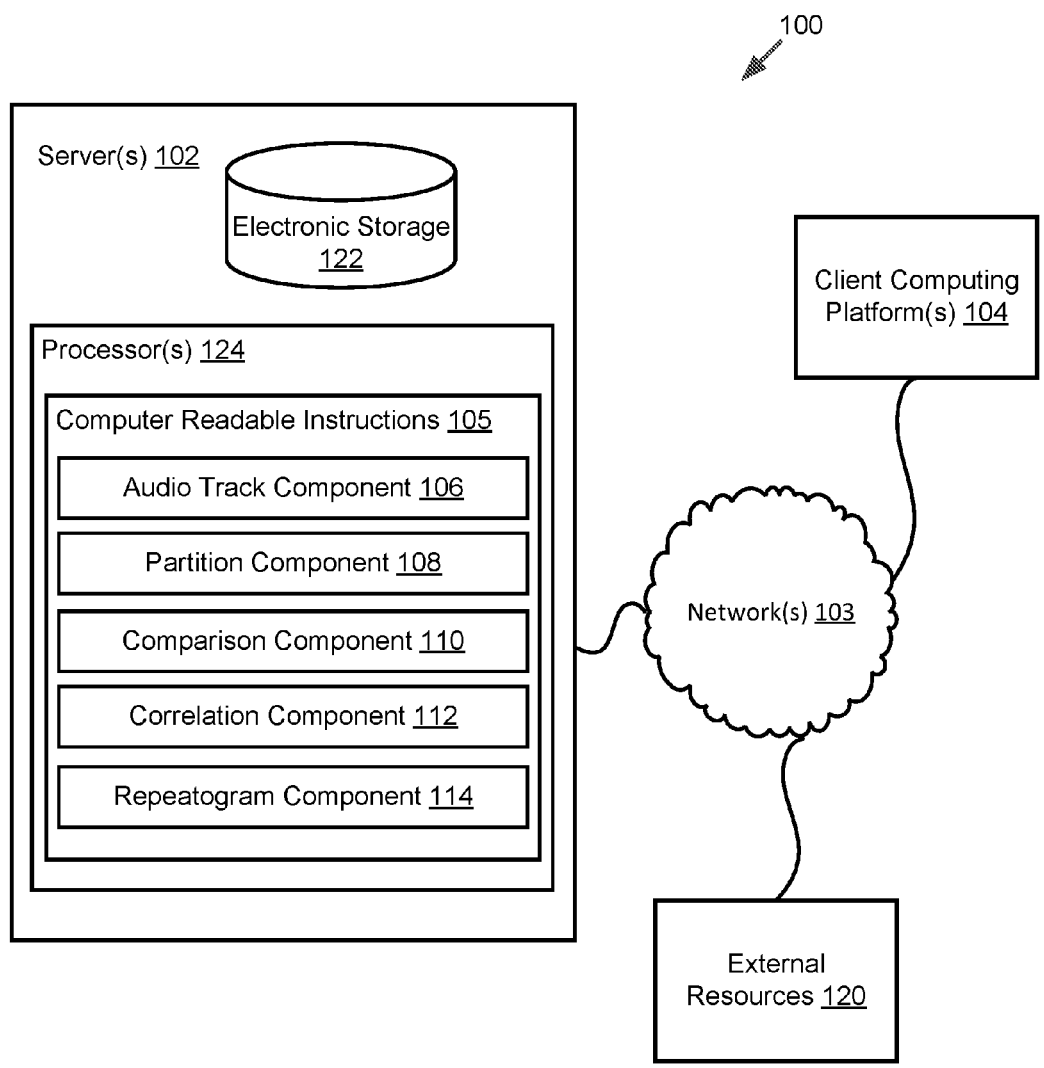
FIG. 1 illustrates a system for constructing a dataset representing repeated sounds within an audio track, in accordance with one or more implementations.

FIG. 1 illustrates a system 100 constructing a dataset representing repeated sounds within an audio track, in accordance with one or more implementations. As is illustrated in FIG. 1, system 100 may include one or more server(s) 102. Server(s) 102 may be configured to communicate with one or more client computing platforms 104 according to a client/server architecture. The users of system 100 may access system 100 via client computing platform(s) 104. Server(s) 102 may be configured to execute one or more computer program components. The computer program components may include one or more of audio track component 106, partition component 108, comparison component 110, correlation component 112, repeatogram component 114, and/or other components.

A repository of media files may be available via system 100 (e.g., via electronic storage 122 and/or other storage location). The repository of media files may be associated with different users. In some implementations, system 100 and/or server(s) 102 may be configured for various types of media files that may include video files that include audio content, audio files, and/or other types of files that include some audio content. Other types of media items may include one or more of audio files (e.g., music, podcasts, audio books, and/or other audio files), multimedia presentations, photos, slideshows, and/or other media files. The media files may be received from one or more storage locations associated with client computing platform(s) 104, server(s) 102, and/or other storage locations where media files may be stored. Client computing platform(s) 104 may include one or more of a cellular telephone, a smartphone, a digital camera, a laptop, a tablet computer, a desktop computer, a television set-top box, a smart TV, a gaming console, and/or other client computing platforms. In some implementations, the plurality of media files may include audio files that may not contain video content.

Audio track component 106 may be configured to obtain one or more audio tracks from one or more media files. By way of non-limiting illustration, an audio track and/or other audio tracks may be obtained from a media file and/or other media files. The media file may be available within the repository of media files available via system 100 and/or available on a third party platform, which may be accessible and/or available via system 100.

Audio track component 106 may be configured to obtain audio content obtained from one or more audio tracks obtained from one or more media files. Audio content may include musical content. As one example, musical content may be in the form of a musical composition such as a song performance, a classical music performance, an electronic music performance and/or other musical content.

Figure 2:
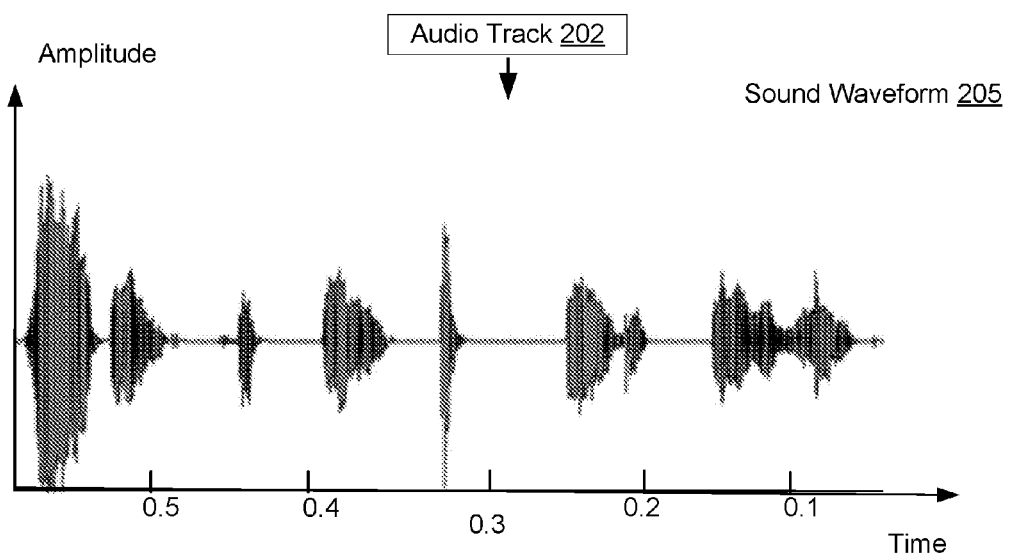
FIG. 2 illustrates an exemplary representation of obtaining an audio track, in accordance with one or more implementations.

Audio track component 106 may be configured to obtain audio tracks from media files by extracting audio signals from media files, and/or by other techniques. By way of non-limiting illustration, audio track component 106 may be configured to obtain the audio track by extracting audio signal from the media file. For example and referring to FIG. 2, audio track 202 may contain audio information. Audio information may contain sound information which may be graphically visualized as waveform of sound pressure 205 as a function of time.

The sound wave's amplitude is mapped on the vertical axis with time on the horizontal axis. Thus, the audio information contained within a media file may be extracted in the form of an audio track.

Referring back to FIG. 1, in some implementations, audio track component 106 may be configured to extract audio signals from one or more media files associated with one or more frequency by applying one or more frequency bandpass filters. For example, a frequency bandpass filter applied to the media file may extract audio signal having frequencies between 1000 Hz and 5000 Hz.

Audio track component 106 may be configured to extract audio features of the audio information obtained from the audio track. Audio features may include audio energy representations, audio frequency representations, harmonic sound information, and/or other features.

In some implementations, audio track component 106 may be configured to extract one or more audio energy representations from one or more audio tracks. By way of non-limiting illustration, an audio energy representation and/or other representations may be extracted from the audio track.

In some implementations, audio track component 106 may be configured to transform one or more audio energy representations into a frequency domain to generate a spectral energy profile of the one or more audio energy representations. By way of non-limiting illustration, audio track component 106 may be configured to transform the audio energy representation of the audio track into a frequency domain to generate a spectral energy profile of the audio energy representation.

In some implementations, audio track component 106 may be configured to obtain harmonic sound information representing a harmonic sound from one or more audio tracks. Harmonic information may be obtained by transforming one or more audio energy representations of one or more audio tracks into a frequency space in which energy may be represented as a function of frequency to generate a harmonic energy spectrum of the one or more audio tracks.

Partition component 108 may be configured to obtain one or more partition sizes. One or more partition sizes may include a partition size value that refers to a portion of an audio track duration. Partition size value may be expressed in time units including seconds, milliseconds, and/or other units. Partition component 108 may be configured to obtain partition size values that may include a partition size generated by a user, a randomly generated partition size, and/or otherwise obtained. By way of non-limiting illustration, a partition size may be obtained.

Partition component 108 may be configured to partition one or more audio track durations of one or more audio tracks into multiple partitions of one or more partition sizes. Individual partitions of one or more partition sizes may span the entirety of the audio track comprised of audio information obtained via audio track component 106 from the audio wave content of one or more audio tracks. By way of non-limiting illustration, the audio track may be partitioned into multiple partitions of the partition size. Individual partitions may occur at different time periods of the audio track duration. By way of non-limiting illustration, individual partitions of the partition size partitioning the audio track may occur at different time periods of the audio track duration.

Figure 3:
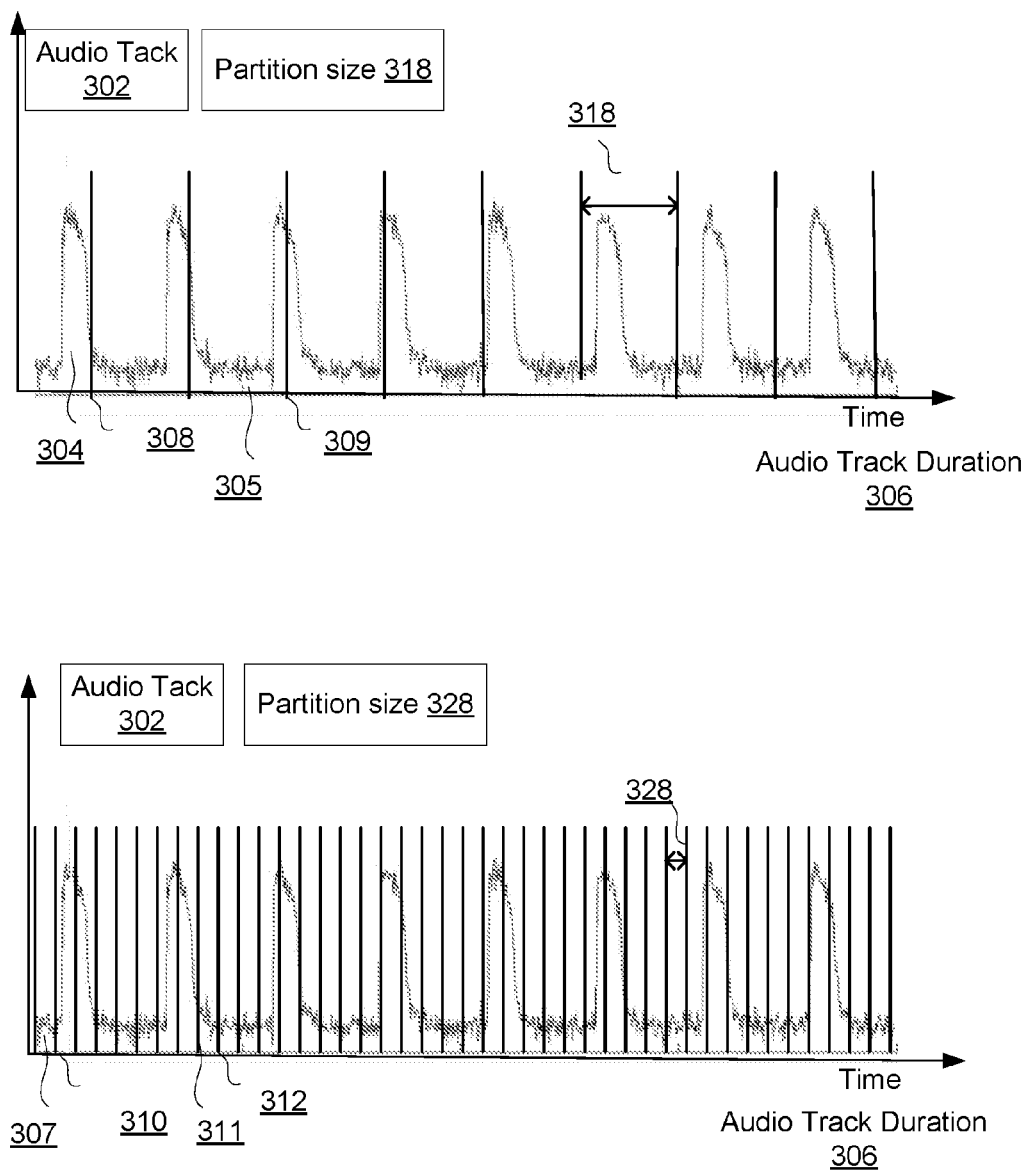
FIG. 3 illustrates an exemplary schematic of partitioning an audio track duration into partitions of varying partition size, in accordance with one or more implementations.

For example, and as illustrated in FIG. 3, audio track 302 of audio track duration 306 may be partitioned into multiple partitions of partition size 318. Audio track 302 of audio track duration 306 may be partitioned into multiple partitions of partition size 328. Partition size 318 may be different than partition size 328. Partition 304 of partition size 318 may occur at time period 308 of audio track duration 306. Partition 305 of partition size 318 may occur at time period 309 of audio track duration 306. Partition 307 of partition 328 may occur at time period 310 of audio track duration 306. Partition 311 of partition size 328 may occur at time period 312 of audio track duration 306.

Figure 4:
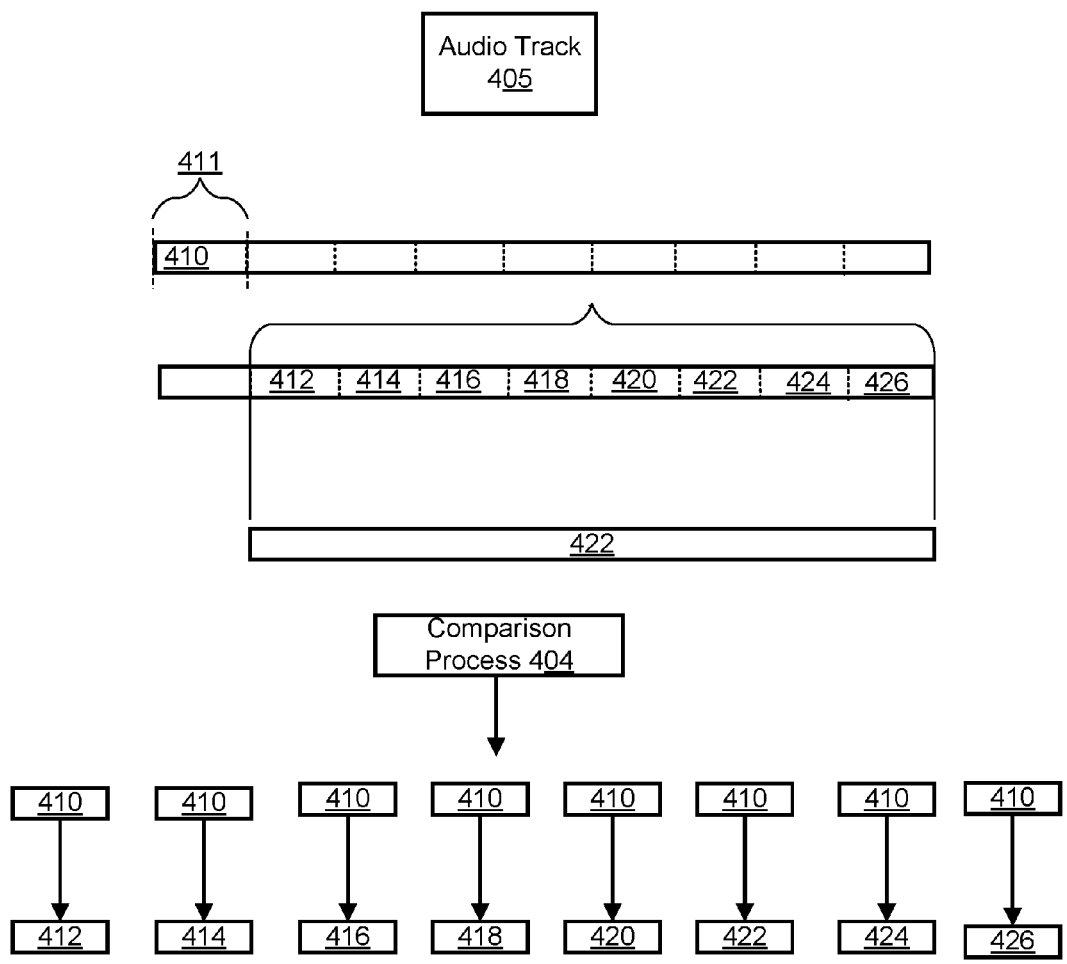
FIG. 4 illustrates an exemplary schematic of a comparison process between a current partition of an audio track and remaining partitions into which the audio track was partitioned, in accordance with one or more implementations.

Referring back to FIG. 1, comparison component 110 may be configured to compare one or more partitions of one or more audio tracks to remaining one or more partitions of one or more audio tracks. For example, comparison component 110 may be configured to correlate audio features of one or more partitions of one or more audio tracks. By way of non-limiting illustration, a current partition of the partition size of the audio track may be compared against all remaining partitions of the current partition size of the audio track to correlate individual audio features of individual remaining partitions. For example, and as illustrated by FIG. 4, comparison process 404 may compare current partition 410 of partition size 411 of audio track 405 against remaining partitions 422 of partition size 411. Remaining partitions may be partition 412, partition 414, partition 416, partition 418, partition 420, partition 422, partition 424, partition 426. Comparison process 404 may compare current partition 410 to partition 412. Comparison process 404 may compare current partition 410 to partition 414. Comparison process 404 may compare current partition 410 to partition 416. Comparison process 404 may compare current partition 410 to partition 418. Comparison process 404 may compare current partition 410 to partition 420. Comparison process 404 may compare current partition 410 to partition 422. Comparison process 404 may compare current partition 410 to partition 424. Comparison process 404 may compare current partition 410 to partition 426.

Referring back to FIG. 1, in various implementations, comparison component 110 may be configured to compare one or more audio features of one or more partitions of one or more audio tracks. For example, comparison component 110 may be configured to compare one or more audio energy representations of one or more partitions of one or more audio tracks. In some implementations, comparison component 110 may be configured to compare one or more audio frequency representations of one or more partitions of one or more audio tracks. In yet another implementation, comparison component 110 may be configured to compare one or more harmonic information of one or more partitions, of one or more audio tracks, including pitch of the harmonic sound and harmonic energy of one or more partitions and/or other features.

In some implementations, comparison component 110 may be configured to compare audio features of individual partitions of one or more audio track within the multi-resolution framework, which is incorporated by reference.

Referring back to FIG. 1, this process performed by comparison component 110 may be iterative such that comparison component 110 may compare audio features of the current partition of the partition size of the audio track against remaining partitions of the partition size of the audio track of the audio track for every partition of the audio track whereby changing the position of the current partition within the audio track duration with individual iteration until the end of the audio track duration has been reached. For example, if the number of the partitions partitioning the audio track duration is x, comparison component 110 may be configured to perform the comparison process x times. First, a partition at a first audio track duration position may be compared to x−1 number of partitions, then, at next iteration comparison component 110 may be configured to compare a partition at a second audio track duration position to x−1 number of partitions, and so on, until the last partition of the number of partitions is reached. System 100 may accumulate a number of transmitted correlation results obtained from comparison component 110. The correlation results may be transmitted to system 100 and a determination for the most accurate result during each iteration may be made.

In various implementations, comparison component 110 may be configured to apply one or more constraint parameters to control the comparison process. The comparison constraint parameters may include one or more of setting a minimum distance between comparison being compared, limiting comparison time, limiting frequency bands, limiting a number of comparison iterations and/or other constrains.

Comparison component 110 may be configured to apply a minimum distance parameter when comparing the current partition of the partition size of the audio track against the remaining partitions of the partition size of the audio track. The minimum distance parameter may refer to a portion of the audio track duration between the current partition and the remaining partitions. The minimum distance parameter applied may be constant or may be varied with each comparison iteration. By way of non-limiting illustration, a certain portion of the track duration corresponding to a distance between a current partition and the remaining partitions may be removed from the comparison process. For example, a minimum distance parameter corresponding to a shorter distance between the current partition and the remaining partitions may result in finding correlated partitions characterized by a short distance to the current partition (e.g., a drum beat repeating at every measure). The minimum distance parameter corresponding to a longer distance between the current partition and the remaining partitions may result in finding correlated partitions characterized by a longer distance to the current partition.

The minimum distance parameter may be set by a system, selected by a user, and/or otherwise obtained. In some implementations, the minimum distance parameter may include values that are periodic and cycle through a set of minimum distances with each iteration. For example, the minimum distance parameter may include values representing a distance from a current partition to remaining partitions equal to 0.5 second, 1 second, 2 seconds, 4 seconds, 8 seconds, 16 seconds, 32 seconds, 64 seconds, 128 seconds, 256 seconds, and/or include other values.

Comparison component 110 may be configured to determine a time it took to compare the current partition of the partition size of the audio track against the remaining partitions of the partition size of the audio track. Time taken to compare audio features of the current partition of the audio track to audio features of the remaining individual partitions of the audio track may be transmitted to system 100. Comparison component 110 may utilize the time taken to correlate audio features of the current partition in subsequent comparison iterations. For example, time taken to compare a current partition of the remaining partitions may be equal to 5 seconds. Comparison component 110 may be configured to limit the next comparison iteration at a subsequent temporal window to 5 seconds. In one implementation, the time taken to compare initial current partition may be utilized by the other constraint comparison parameters and/or used as a constant value.

Comparison component 110 may be configured to limit the audio track duration of one or more audio tracks during the comparison process by applying a comparison window set by a comparison window parameter. Comparison component 110 may be configured to limit the audio track duration of one or more audio track being compared by applying the comparison window parameter (i.e., by setting a comparison window). The comparison window parameter may include a time of audio track duration to which the comparison may be limited, a position of the comparison window, including a start position and an end position, and/or other constrains. This value may be predetermined by system 100, set by a user, and/or otherwise obtained.

In some implementation, comparison component 110 may be configured to limit the audio track duration such that the comparison window parameter may not be greater than 50 percent of the audio track duration. For example, if an audio track is 500 seconds then the length of the comparison window set by the comparison window parameter may not be greater than 250 seconds.

The comparison window parameter may have a predetermined start position that may be generated by system 100 and/or may be based on user input. System 100 may generate a start position of the comparison window based on the audio track duration. For example, the start position may be randomly set to a portion of the audio track duration. In some implementations, the user may generate the start position of the comparison window based on specific audio features of the audio track. For example, user may know that an audio track may contain audio features in an introductory portion of the audio track that represent the same sound captured at a final portion of the audio track. For example, a musical composition may be characterized by a number of sections that may be recombined and repeated in different ways throughout the composition. An introductory section may often contain a primary theme that may be repeated often, a middle section may contain original theme that may contain elements of the primary theme, and a final section may contain restatement of the primary theme. Thus, audio features associated with the introductory section and the final section may be used to generate the repeatogram.

Comparison component 110 may be configured to exclude one or more portions of one or more audio tracks from the comparison process based on the comparison window parameter during every comparison iteration. Comparison component 110 may be configured to exclude same and/or different portion of one or more audio tracks from the comparison process. For example, the comparison window parameter may be set such that a portion of the audio track is excluded during every iteration performed by comparison component 110.

In some implementations, comparison component 110 may be configured to compare audio features of the current partition of the audio track against audio features of the remaining partitions of the audio track within the multi-resolution framework, which is incorporated by reference.

For example, comparison component 110 may be configured to compare audio features of the current partitions of the audio track against remaining partitions of the second audio track at a mid-resolution level. Audio features of individual partitions of the audio track at the mid-resolution level may be compared at the mid-resolution level to correlate audio features between the current partition of the audio track and the remaining partitions of the audio track. The result of a first comparison may identify correlated audio features from the current partition and the remaining partitions of the audio tracks that may represent energy in the same sound. The result of the first comparison may be transmitted to system 100 after the first comparison is completed.

The second comparison may be performed at a level of resolution that may be higher than the mid-resolution level. Audio features of individual partitions of the audio track at the higher resolution level may be compared at the higher resolution level to correlate audio features between the current partition of the audio track and the remaining partitions of the audio track. The result of the second comparison may be transmitted to system 100.

This process may be iterative such that comparison component 110 may compare audio features of the current partition of the audio track against audio features of the remaining partitions of the audio track at every resolution level whereby increasing the resolution with individual iteration until the highest level of resolution is reached. For example, if the number of resolution levels within individual audio track is finite, comparison component 110 may be configured to compare audio features at a mid-resolution level first, then, at next iteration, comparison component 110 may be configured to compare audio features at a resolution level higher than the resolution level of previous iteration, and so on. The last iteration may be performed at the highest resolution level. System 100 may accumulate a number of transmitted correlation results obtained from comparison component 110. The correlation results may be transmitted to system 100 and a determination for the most accurate result may be made.

Correlation component 112 may be configured to determine a correlated partition for the current partition from among the remaining partitions of the audio track that is most likely to represent the same sounds as the current partition. By way of non-limiting illustration, correlation component 112 may be configured to determine a correlated partition for the current partition from among the remaining partitions of the audio track based on the results of comparing the current partition of the partition size obtained by partitioning component 108 via comparison component 110 to correlate audio features obtained by audio track component, and/or based on other techniques. The correlated partition may reflect a partition that most likely represents the same sound as the current partition.

In some implementations, correlation component 112 may be configured to determine multiple correlated partitions between the current partition of the audio track and the remaining partitions of the audio track. Individual correlated partitions may be based on comparing individual audio features of one or more partitions of the audio track via comparison component 110, as described above. Correlation component 112 may be configured to assign a weight to individual correlated partitions. Correlation component 112 may be configured to determine a final correlated partition by computing weighted averages of multiple correlated partitions and/or by performing other computations.

Repeatogram component 114 may be configured to record the correlation between the current partition of the audio track and the correlated partition of the audio track. By way of non-limiting illustration, repeatogram component 114 may be configured to record a time from the current partition to the most correlated partition determined by correlation component 112, and/or based on other techniques. With every iteration performed by comparison component 110, repeatogram component 114 may be configured to record a correlation such that a time from a next current partition to the most correlated partition with the next partition is recorded. System 100 may accumulate a number of records associated with times between a current partition and a most correlated partition transmitted by repeatogram component 114.

Repeatogram component 114 may be configured to construct a dataset representing multiple correlations determined by correlation component 112 as a result of multiple iterations performed by comparison component 110. Repeatogram component 114 may be configured to construct a dataset that may visually represent repeated partitions of the audio track by plotting multiple correlations in a two-dimensional time space as data points with the size of individual data points monotonically increasing with correlation strength. The two-dimensional time space may be characterized by a two-coordinate system in which an x-axis may represent the audio duration time, including the current partition time, and a y-axis may represent a time from the current partition to the correlated partition. By way of non-limiting illustration, repeatogram component 114 may be configured to plot the time from the current partition to the most correlated partition determined by correlation component 112 on the y-axis as a function of the current partition time on the x-axis. Repeatogram component 114 may be configured to construct the dataset representing every iteration performed by comparison component 110 such that every time from a next current partition to the most correlated partition with the next partition recorded is plotted in the two-dimensional time space.

Repeatogram component 114 may be configured to include positive and negative values on the y-axis representing the time from the current partition to the correlated partition. The value of the time from the current partition to the correlated partition may be based on the relative position of the current partition to the correlated partition within the audio track duration and/or based on other techniques. By way of non-limiting illustration, repeatogram component 114 may be configured to assign a positive value to the time between the correlated partition and the current partition if the correlated partition occurs after the current partition on the audio track duration. Repeatogram component 114 may be configured to assign a negative value to the time between the correlated partition and the current partition if the correlated partition occurs before the current partition on the audio track duration. Repeatogram component 114 may be configured plot the positive time value on the y-axis representing positive values. Repeatogram component 114 may be configured plot the negative time value on the y-axis representing negative values.

Figure 5:
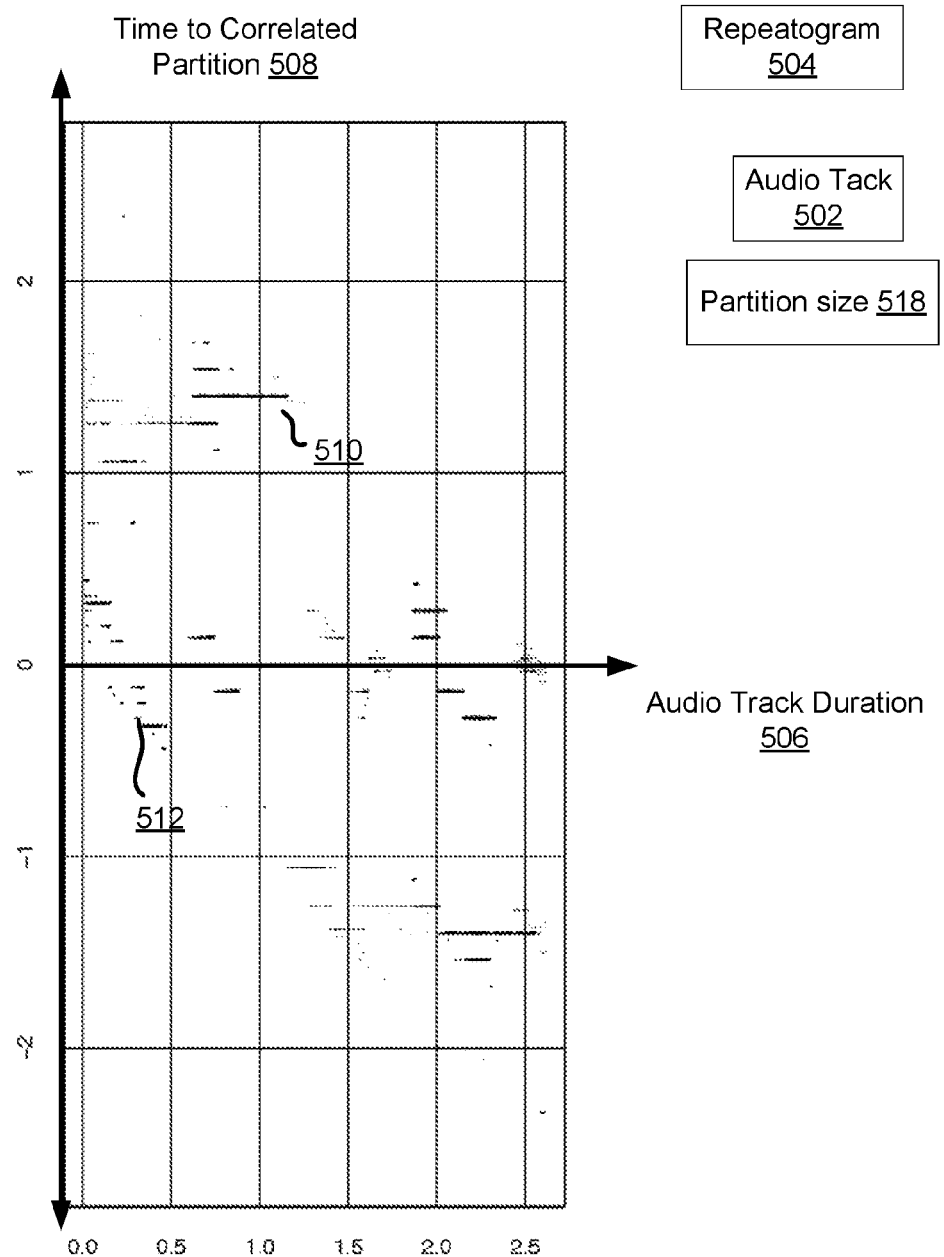
FIG. 5 illustrates an exemplary schematic of a dataset constructed by comparing one or more partition of the audio track to the remaining partitions, in accordance with one or more implementations.

For example, and as illustrated in FIG. 5, repeatogram 504 is constructed from audio track 502 partitioned into partitions of partition size 518. Repeatogram 504 is a visual representation of repeated partitions within audio track 502. Repeatogram 504 displays dataset recorded by repeatogram component 114. The dataset displayed by repeatogram 504 is a plot of multiple correlations in a two-dimensional time space characterized by x-axis 506 representing audio track duration, including the current partition time, and y-axis 508 representing a time from a current partition to a correlated partition. Multiple partitions being sequentially repeated along the audio track duration are represented as solid lines 510 on repeatogram 504. Partitions that do not sequentially repeat along the audio track duration are represented as broken lines 512 on repeatogram 504. Partitions that do not repeat are not represented by either solid or broken lines on repeatogram 504.

Referring again to FIG. 1, in some implementations, server(s) 102, client computing platform(s) 104, and/or external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program components. The computer program components may be configured to enable a producer and/or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a NetBook, a Smartphone, a gaming console, and/or other computing platforms.

External resources 120 may include sources of information, hosts and/or providers of virtual environments outside of system 100, external entities participating with system 100, and/or other resources. In some implementations, some or all of the functionality attributed herein to external resources 120 may be provided by resources included in system 100.

Server(s) 102 may include electronic storage 122, one or more processors 124, and/or other components. Server(s) 102 may include communication lines, or ports to enable the exchange of information with a network and/or other computing platforms. Illustration of server(s) 102 in FIG. 1 is not intended to be limiting. Servers(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may include electronic storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. The processor(s) 124 may be configured to execute computer readable instruction components 106, 108, 110, 112, 114 and/or other components. The processor(s) 124 may be configured to execute components 106, 108, 110, 112, 114 and/or other components by software; hardware; firmware; some combination of software, hardware, and/or firmware; and/or other mechanisms for configuring processing capabilities on processor(s) 124.

It should be appreciated that although components 106, 108, 110, 112, and 114 are illustrated in FIG. 1 as being co-located within a single processing unit, in implementations in which processor(s) 124 includes multiple processing units, one or more of components 106, 108, 110, 112, and/or 114 may be located remotely from the other components. The description of the functionality provided by the different components 106, 108, 110, 112, and/or 114 described herein is for illustrative purposes, and is not intended to be limiting, as any of components 106, 108, 110, 112, and/or 114 may provide more or less functionality than is described. For example, one or more of components 106, 108, 110, 112, and/or 114 may be eliminated, and some or all of its functionality may be provided by other ones of components 106, 108, 110, 112, and/or 114. As another example, processor(s) 124 may be configured to execute one or more additional components that may perform some or all of the functionality attributed herein to one of components 106, 108, 110, 112, and/or 114.

Figure 6:
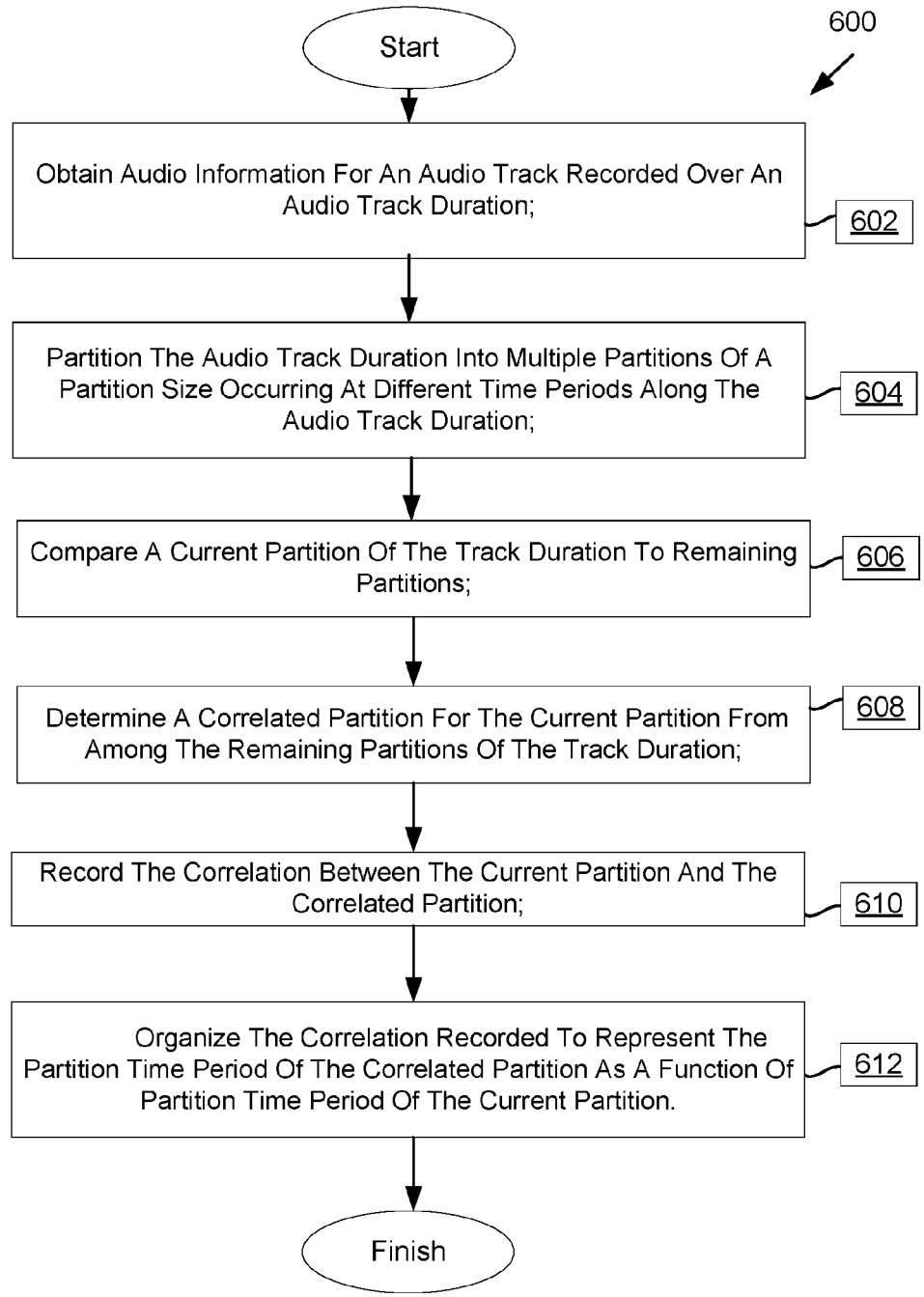
FIG. 6 illustrates a method for constructing a dataset representing repeated sounds within an audio track, in accordance with one or more implementations.

FIG. 6 illustrates a method 600 for constructing a dataset representing repeated sounds within an audio track, in accordance with one or more implementations. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 and described below is not intended to be limiting.

In some implementations, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At an operation 602, audio information may be obtained from an audio track of an audio track duration. Operation 602 may be performed by one or more physical processors executing an audio track component that is the same as or similar to audio track component 106, in accordance with one or more implementations.

At an operation 604, an audio track may be partitioned into partitions of a partition size occurring at different time periods along the audio track duration. Operation 604 may be performed by one or more physical processors executing a partition component that is the same as or similar to partition component 108, in accordance with one or more implementations.

At an operation 606, a current partition of the audio track duration may be compared to remaining partitions. Operation 606 may be performed by one or more physical processors executing a comparison component that is the same as or similar to comparison component 110, in accordance with one or more implementations.

At an operation 608, a correlated partition for the current partition from among the remaining partitions of the track duration may be determined. Operation 608 may be performed by one or more physical processors executing a correlation component that is the same as or similar to correlation component 112, in accordance with one or more implementations.

At an operation 610, the correlation between the current partition and the correlated partition may be recorded. At an operation 612 the correlation recorded to represent the partition time period of the correlated partition as a function of partition time period of the current partition may be organized. Operations 610 and 612 may be performed by one or more physical processors executing a repeatogram component that is the same as or similar to repeatogram component 114, in accordance with one or more implementations.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method for constructing a dataset for representing repeated sounds within an audio track, comprising:
   (a) obtaining audio information for an audio track recorded over a track duration;
   (b) partitioning the track duration into multiple partitions, the individual partitions occurring at different time periods of a partition size along the track duration;
   (c) comparing a current partition of the track duration to remaining partitions;
   (d) determining a correlated partition for the current partition from among the remaining partitions of the track duration, the correlated partition being identified as most likely to represent the same sound as the current partition;
   (e) recording the correlation between the current partition and the correlated partition;
   (f) iterating over operations (c)-(e) for individual ones of the remaining partitions; and
   organizing the correlations recorded at iterations of operation (e) to represent the partition time period of the correlated partition as a function of partition time period of the current partition.

2. The method of claim 1, wherein the audio track is generated from a media file, the media file including audio and video information.

3. The method of claim 1, wherein the audio information including an audio energy representation.

4. The method of claim 3, wherein the audio energy representation is filtered into a frequency band to produce a frequency energy representation, the frequency energy representation representing individual energy samples associated with sound in the frequency band captured on the audio track.

5. The method of claim 3, wherein the comparing step includes correlating individual energy samples in the frequency band of the current partition of the audio track with individual energy samples in the frequency band in the remaining partitions of the audio track.

6. The method of claim 3, wherein the audio energy representations of individual partitions are transformed into frequency space in which energy is represented as a function of frequency.

7. The method of claim 6, wherein individual transformed representations of individual partitions include identifying pitches of harmonic sound and determining magnitudes of harmonic energy at harmonics of the harmonic sound.

8. The method of claim 7, wherein the comparing step includes correlating pitch of the harmonic sound and harmonic energy of the transformed representation of the current partition of the audio track with pitch of the harmonic sound and harmonic energy of transformed representations in the remaining partitions of the audio track.

9. The method of claim 1, further comprising:
   selecting a comparison window to at least one portion of the audio track, the comparison window having a start position and an end position, such that the start position corresponding with a point of the track duration the point having been selected at random, the end position corresponding with the point of the track duration having a predetermined value.

10. The method of claim 1, further comprising:
    obtaining a correlation threshold;
    comparing the correlated portion with the correlation threshold; and
    determining whether to continue comparing the current partition of the audio track to the remaining partitions of the audio track based on the comparison of the correlated portion and the correlation threshold.

11. The method of claim 10, wherein determining whether to continue comparing the current partition of the audio track with the remaining partitions of the audio track includes determining to not continue comparing in response to the correlated partition being smaller than the correlated threshold.

12. The method of claim 1, further comprising:
    determining whether to continue comparing the current partition of the audio track with the remaining partitions of the audio track by assessing whether a stopping criteria has been satisfied, such determination being based on the correlated partition and the stopping criteria.

13. The method of claim 12, wherein the stopping criteria is satisfied by multiple, consecutive determinations of the correlated partition falling within a specific range or ranges.

14. The method of claim 13, wherein the specific range or ranges are bounded by a correlation threshold or thresholds.

15. The method of claim 1, wherein operations (a)-(f) are performed by a system comprising one or more physical computer processors configured by computer readable instructions.

16. The method of claim 1, wherein the organizing the correlations recorded at iterations of operation (e) step is performed by a system comprising one or more physical computer processors configured by computer readable instructions.

17. The method of claim 9, wherein the selecting the comparison window step is performed by a system comprising one or more physical computer processors configured by computer readable instructions.

18. The method of claim 10, wherein the obtaining the correlation threshold step is performed by a system comprising one or more physical computer processors configured by computer readable instructions.

19. The method of claim 10, wherein the comparing the correlated portion with the correlation threshold step is performed by a system comprising one or more physical computer processors configured by computer readable instructions.

20. The method of claim 10, wherein the determining whether to continue comparing the current partition of the audio track to the remaining partitions of the audio track step is performed by a system comprising one or more physical computer processors configured by computer readable instructions.

* * * * *